US007684645B2

(12) United States Patent
Vitsnudel et al.

(10) Patent No.: US 7,684,645 B2
(45) Date of Patent: *Mar. 23, 2010

(54) ENHANCED WIDE DYNAMIC RANGE IN IMAGING

(75) Inventors: Ilia Vitsnudel, Even Yehuda (IL); Noam Sorek, Zichron Yaacov (IL)

(73) Assignee: Sightic Vista Ltd, Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/146,053

(22) Filed: Jun. 25, 2008

(65) Prior Publication Data

US 2009/0040337 A1 Feb. 12, 2009

Related U.S. Application Data

(63) Continuation of application No. 10/622,355, filed on Jul. 17, 2003, now Pat. No. 7,409,104.

(60) Provisional application No. 60/396,323, filed on Jul. 18, 2002.

(51) Int. Cl.
  *G06K 9/36* (2006.01)
  *H04N 5/235* (2006.01)
(52) U.S. Cl. .................... 382/284; 348/362
(58) Field of Classification Search .......... 382/284
  See application file for complete search history.

(56) References Cited

U.S. PATENT DOCUMENTS

| | | | |
|---|---|---|---|
| 4,672,430 A * | 6/1987 | Asaida | 348/253 |
| 5,144,442 A | 9/1992 | Ginosar et al. | |
| 5,247,366 A | 9/1993 | Ginosar et al. | |
| 5,309,243 A | 5/1994 | Tsai | |
| 5,416,815 A * | 5/1995 | Hsieh | 378/4 |
| 5,420,635 A * | 5/1995 | Konishi et al. | 348/362 |

(Continued)

OTHER PUBLICATIONS

Smith, B.C., Rowe, L.A., "Algorithms for Manipulating Compressed Images", Computer Graphics and Applications, IEEE, Sep. 1993, vol. 13, Issue: 5, ISSN: 0272-1716.*

(Continued)

*Primary Examiner*—Sath V. Perungavoor
(74) *Attorney, Agent, or Firm*—Pearl Cohen Zedek Latzer, LLP (57) ABSTRACT

A method for enhancing wide dynamic range in images is disclosed. The method comprises acquiring at least two images of a scene to be imaged, the images acquired using different exposure times. For a first image an illumination mask is constructed corresponding to the illumination in the scene, comprising a set of continuous weight values distinctively identifying respective areas of pixels of high or low illumination, over-exposed or underexposed with respect to a predetermined threshold illumination value, assigning one of the weight values to each pixels, whereas other weight value is assigned to other pixels of the other images. A spatial low-pass filter is used to smooth border zones on the illumination mask, thus assigning pixels in the border zones new continuous weight values in a range between the weight values. A combined image is constructed using combined weight values with image data of pixels assigned with one weight value of the first image and image data of pixels assigned with other weight value of the other images and in pixels corresponding to the border zones using image data from the images proportional to the new weight values.

12 Claims, 5 Drawing Sheets

U.S. PATENT DOCUMENTS

| | | | |
|---|---|---|---|
| 5,801,773 A * | 9/1998 | Ikeda | 348/229.1 |
| 5,873,830 A * | 2/1999 | Hossack et al. | 600/447 |
| 6,040,858 A * | 3/2000 | Ikeda | 348/242 |
| 6,204,881 B1 * | 3/2001 | Ikeda et al. | 348/362 |
| 6,249,314 B1 | 6/2001 | Yamamoto et al. | |
| 6,587,149 B1 * | 7/2003 | Yoneyama et al. | 348/362 |
| 6,825,884 B1 * | 11/2004 | Horiuchi | 348/362 |
| 7,088,372 B2 | 8/2006 | Yoshida | |
| 7,098,946 B1 * | 8/2006 | Koseki et al. | 348/229.1 |
| 7,120,303 B2 | 10/2006 | Mitchell et al. | |
| 7,239,805 B2 * | 7/2007 | Uyttendaele et al. | 396/222 |
| 7,409,104 B2 * | 8/2008 | Vitsnudel et al. | 382/284 |
| 2002/0154829 A1 | 10/2002 | Tsukioka | |
| 2003/0133035 A1 * | 7/2003 | Hatano | 348/362 |
| 2003/0214600 A1 * | 11/2003 | Kido | 348/362 |
| 2007/0183622 A1 * | 8/2007 | Hannigan et al. | 382/100 |

OTHER PUBLICATIONS

Smith, B.C., "A Survey of Compressed Domain Processing Techniques", Oct. 1995, http://www.cs.cornell.edu/zeno/Papers/cdp/cdpsurvey.html.*

* cited by examiner

DC coefficient

AC coefficients

Four first coefficients

ENHANCED WIDE DYNAMIC RANGE IN IMAGING

CROSS REFERENCE

This application is a continuation of U.S. patent application Ser. No. 10/622,355, filed Jul. 17, 2003 now U.S. Pat. No. 7,409,104, in accordance with 35 U.S.C. § 120, and claims the benefit of U.S. Provisional Patent Application No. 60/396,323, filed Jul. 18, 2002, the entirety of which is incorporated by reference herein.

FIELD OF THE INVENTION

The present invention relates to image enhancement. More particularly it relates to enhancing wide dynamic range in imaging.

BACKGROUND OF THE INVENTION

When a photograph is taken with an object of particular illumination with background of significantly higher illumination most imaging apparatuses fail to record the composite image in same detail accuracy. Either the background appears in great details and the object in front of the background appears poorly lit, or the object is shown in great details and the background appears over-exposed.

In order to address this problem the photographic sensor has to be able to exhibit a very wide dynamic range, alas photographic sensors in general are limited in the dynamic range they are sensitive to.

It is a purpose of the present invention to introduce a novel method and apparatus for enhancing the dynamic range in images, employing a virtual binary illumination mask.

SUMMARY OF THE INVENTION

There is thus provided, in accordance with a preferred embodiment of the present invention, a method for enhancing wide dynamic range in images, the method comprising:

acquiring at least two images of a scene to be imaged, the images acquired using different exposure times;

constructing for a first image of said at least two images an illumination mask comprising a set of weight values distinctively identifying respective areas of pixels of high or low illumination, over-exposed or underexposed with respect to a predetermined threshold illumination value, assigning one of the weight values to each pixels, whereas other weight value is assigned to other pixels of the other of said at least two images;

using a low-pass filter to smooth border zones between pixels of one weight value and pixels of other weight value, thus assigning pixels in the border zones new weight values in a range between the weight values;

constructing a combined image using image data of pixels assigned with one weight value of the first image and image data of pixels assigned with other weight value of the other of said at least two images and in pixels corresponding to the border zones using image data from said at least two images proportional to the new weight values.

Furthermore, in accordance with a preferred embodiment of the present invention, the weight values are binary values.

Furthermore, in accordance with a preferred embodiment of the present invention, the acquired images are in JPEG format, the JPEG format including a DCT transform domain.

Furthermore, in accordance with a preferred embodiment of the present invention, the step of constructing the combined image is carried out in the DCT transform domain.

Furthermore, in accordance with a preferred embodiment of the present invention, the following relation is used in the constructing the combined image:

$$I_{p,q}^{DCT_{WDR}} = \alpha(I_{DC}^{Long}) * I_{p,q}^{DCT_{Long}} + (1 - \alpha(I_{DC}^{Long})) * I_{p,q}^{DCT_{Short}} \cdot \text{Ratio}$$

where $I_{DC}^{Long}$ is the DC coefficient of the DCT transform of the relatively longer exposure image, a is a weight representing the illumination mask and Ratio is a measure that defines the relation between the images of different exposure exposures, and p, q are DCT coefficients and * represents convolution.

Furthermore, in accordance with a preferred embodiment of the present invention, only first few DCT coefficients are used in calculating the relation.

Furthermore, in accordance with a preferred embodiment of the present invention, wherein p=1 and q=1.

Furthermore, in accordance with a preferred embodiment of the present invention, wherein, for color imaging, the steps of claim 1 are carried our separately for each color plane.

Furthermore, in accordance with a preferred embodiment of the present invention, the method further comprises:

detecting pixels in said at least two images indicative of motion by comparing corresponding image data from said at least two images;

evaluating image data value for pixels identified as indicative of motion using image data from one of said at least two images and using the image data value in constructing the combined image.

Furthermore, in accordance with a preferred embodiment of the present invention, the step of detecting pixels indicative of motion comprises looking for pixels for which the ratio $I^{Long}/\hat{I}^{Long}$ is beyond a predetermined threshold, $I^{Long}$ is image data from one of said at least two images which was acquired with longest exposure time, and $$\hat{I}^{Long} = \begin{cases} I^{Short} \cdot \text{Ratio} & \text{where } I^{Short} \cdot \text{Ratio} < 255 \\ 255 & \text{else} \end{cases}$$

where Ratio is a measure that defines the relation between the images of different exposure.

Furthermore, in accordance with a preferred embodiment of the present invention, the step of constructing a combined image includes using for pixels identified as indicative of motion only image data from one of said at least two images.

Furthermore, in accordance with a preferred embodiment of the present invention, the image data from one of said at least two images is reconstructed to simulate corresponding pixels in the other of said at least two images.

Furthermore, in accordance with a preferred embodiment of the present invention, the method also includes using image data from one of said at least two images which was acquired with longest exposure time incorporated in two illumination masks.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 5c is a threshold image after a threshold filter was applied on the "long" exposure image of FIG. 5a.

DETAILED DESCRIPTION OF PREFERRED EMBODIMENTS

Ideally, 10-14 bits per pixel would represent the wide dynamic range input signal. However, common photographic sensor devices do not exhibit such wide dynamic range signals.

An aspect of the present invention is the use of multiple exposures in the acquisition process of an image. The same scene is imaged more than once (in most cases, two exposures are sufficient). One exposure is made at a low level of sensitivity (e.g. with an electronic shutter set at a short exposure time). That "short" exposure contains highlight details, but most dark image areas are lost in the noise. A second (or further) exposure of the same image is taken at a relatively high level of sensitivity (e.g. at a long exposure time). The "long" exposure contains details of the darker parts of the image, but the brighter area may come out saturated, without any details.

Another aspect of the present invention, subsequent to the acquisition, is the combination of the images in a predetermined manner so as to produce a single, wide dynamic range, image. The predetermined manner consists of identifying in the acquired images areas of high or low illumination and mapping them and treating them separately—using image data from the short exposure image in areas of high illumination, and using image data from the long exposure image in areas of low illumination. Furthermore, in interim border zones between the areas (or in fact where it is desired so), a combination of weighted values from the image data of both short and long exposure images is used.

The wide range image may preferably be further processed, for example by using dynamic range compression algorithm, to reduce the dynamic range down to a useful level—normally 8 bits.

The JPEG format is one of the main image compression tools used worldwide. It is suggested that the two images of "long" and "short" exposures be acquired by a camera and be stored in the JPEG format. In following we will describe a method for a construction of the wide dynamic range image from these images directly in the JPEG domain. Such an approach allows one to save a significant amount of computation efforts and reduce large portion of the memory because it doesn't require an explicit opening of the compressed images and is applied on the pixel (or more precisely JPEG block) basis. Note, however, that the present invention is not limited to JPEG formats only and is in fact independent of the image compression format used (if at all).

Suppose that a given scene with wide dynamic range of illumination is represented by the two images: $I^{Long}$ and $I^{Short}$, where $I^{Long}$ is an image of the scene with a "long" exposure and $I^{Short}$ is the image of the scene with a "short" exposure. The long exposure provides image details in the dark areas, while the short exposure provides the details in bright areas. These images are related by the following:

$$I^{Long} = \begin{cases} I^{Short} \cdot \text{Ratio} & \text{where } I^{Short} \cdot \text{Ratio} < 255 \\ 255 & \text{else} \end{cases}$$

This relation means that except for noise and quantization issues "long" and "short" images are linearly related. Hence, combining $I^{Long}$ and $I^{Short}$ images with the following composing function does the construction of the wide dynamic range image.

The construction is performed on a pixel-by-pixel basis by:

$$I^{WDR} = \alpha(I^{Long}) \cdot I^{Long} + (1-\alpha(I^{Long})) \cdot I^{Short} \cdot \text{Ratio} \qquad (1)$$

In the JPEG domain (or DCT transform) the images are given by:

$$I^{DCT}_{p,q} = \alpha_p \alpha_q \sum_{m=0}^{M-1} \sum_{n=0}^{N-1} I_{m,n} \cos\left(\frac{\pi(2m+1)p}{2M}\right) \cos\left(\frac{\pi(2n+1)q}{2N}\right), \begin{array}{l} 0 \leq p \leq M-1 \\ 0 \leq q \leq N-1 \end{array}$$

$$\alpha_p = \begin{cases} \frac{1}{\sqrt{M}}, & p = 0 \\ \sqrt{\frac{2}{M}}, & 1 \leq p \leq M-1 \end{cases} \quad \alpha_q = \begin{cases} \frac{1}{\sqrt{N}}, & q = 0 \\ \sqrt{\frac{2}{N}}, & 1 \leq q \leq N-1 \end{cases}$$

where M and N are the row and column size of DCT block (8×8 pixels), respectively and $\alpha_p$ and $\alpha_q$ are respective transform normalization coefficients.

It is evident that in terms of its cosine coefficients the DCT transform is a linear function. Therefore taking into account a linear relation between the $I^{Long}$ and $I^{Short}$ images it is possible to construct a wide dynamic range image directly in the DCT transform domain using relation (1) by replacing a multiplication by convolution operator.

$$I_{p,q}^{DCT_{WDR}} = \alpha(I_{DC}^{Long}) * I_{p,q}^{DCT_{Long}} + (1 - \alpha(I_{DC}^{Long})) * I_{p,q}^{DCT_{Short}} \cdot \text{Ratio}$$

where $I_{DC}^{Long}$ is the DC coefficient of the DCT transform of the "long" image and "*" designates convolution operation. Taking into an account a very smooth nature of the $\alpha(I_{DC})$ function it is possible to use only a small number of DCT coefficients. For some images with high frequency content it might be necessary to use a DC component for the $\alpha$, with DCT coefficients p=1, q=1.

Reference is now made to the figures in order to demonstrate the approach described above. To display the resultant wide dynamic range image, simple gamma function has been applied as post-processing to the obtained resulting image.

The initial wide dynamic range image is obtained by combining "long" and "short" images by the use of so called "illumination mask". The illumination mask is calculated based on strongly low-pass filtered version of the thresholded "long" image. Applying a threshold to the image removes delicate details and therefore the resultant image represents a kind of illumination, which was present during the image acquisition. Saturated portions of the image representing bright lighting indicate that "short" exposure should be used in these regions. A subsequent low-pass filter smoothes the illumination mask enabling soft transition between the data present in "long" and "short" images. In order to efficiently implement the above procedure a subsampled version of the low-pass filter is used. First, the filter is applied to the decimated (subsampled) version of the "long" signal. Eight times decimation is used for the better fit to the JPEG signal organization. $I^{Long}$ signal is decimated to obtain $I_{DEC\_8}^{Long}$. (The factor of 8 is chosen to be consistent with the blocks definition of the DCT transform used in JPEG compression). Then a four-directional IIR (Infinite Impulse Response) filter of the first order is applied:

$$I^{LP} = I^{LP} + \alpha \cdot (I_{Dec\_8}^{Long} - I^{LP})$$

where $\alpha$ is an IIR coefficient, chosen to be 0.05 and $I_{Dec\_8}^{Long}$ is either a "long" signal itself or its clipped version as explained previously.

Note that although in the explanation hereinabove the "long" image data is treated first with the illumination mask and the "short" image data is used in the final combining stage, it is possible to apply the illumination mask on the "short" image data and use the "long" image data in the final combining step. In other words: the order in which the "long" and "short" images are treated bears no significance.

Since the illumination mask bears strong low-pass filtered signal characteristics it is possible simply extend the illumination mask to the full grid by simple bilinear interpolation, which might be performed in very efficient and fast way. The resultant illumination mask will be designated by $\omega$. Thus the resultant wide dynamic range signal will be composed by:

$$I^{WDR} = I^{Long} + \omega \cdot (I^{Short} - I^{Long}) \quad (1)$$

Noise and color or JPEG artifacts are significantly reduced in the new approach of the present invention.

The described approach to the construction of the wide range image might be implemented directly in the JPEG domain. Using it in the JPEG domain eliminates the need for additional signal decompression and recompression and therefore provides significant computational savings.

We examine equation (1) with respect to the DCT image block of 8×8 pixels. For such a block, assuming that the "illumination mask" is constant per block, equation (1) might be implemented directly in the JPEG domain (in the same way for each DCT coefficient). However, this assumption is not correct and will lead to the strong characteristic JPEG blockiness effect. On the other hand using the fact that the $\omega$ is not constant, but has a linear plane form, since it was obtained from the bilinear interpolation of the low-pass filter on the sparse grid, enables one to reproduce equation (1) in the JPEG domain with some approximation. The equation (1) incorporated with the DCT transformation is as follows:

$$I^{DCT_{WDR}} = I^{DCT_{Long}} + W^{DCT} * (I^{DCT_{Short}} - I^{DCT_{Long}}) \quad (2)$$

where * designates convolution. Equation (2) was obtained using the fact that multiplication operator becomes a convolution under the Fourier transform. The $W^{DCT}$ term in equation (2) represents a DCT transform of the 8×8 plane, which has the most significant coefficients only at first column and row (as seen in the following example).

| 60.9553 | −1.0903 | −0.0612 | −0.1090 | 0.0000 | −0.0362 | −0.0043 | −0.0063 |
|---|---|---|---|---|---|---|---|
| −0.5233 | −0.0031 | 0.0017 | −0.0005 | −0.0000 | −0.0000 | 0.0001 | −0.0001 |
| −0.0422 | −0.0010 | 0.0001 | −0.0001 | 0.0000 | −0.0000 | 0.0000 | −0.0000 |
| −0.0809 | −0.0010 | 0.0003 | −0.0001 | 0.0000 | −0.0000 | 0.0000 | −0.0000 |
| −0.0202 | −0.0005 | 0.0001 | −0.0001 | −0.0000 | −0.0000 | 0.0000 | −0.0000 |
| −0.0255 | −0.0003 | 0.0001 | −0.0000 | −0.0000 | −0.0000 | 0.0000 | −0.0000 |
| −0.0044 | −0.0001 | 0.0000 | −0.0000 | 0.0000 | −0.0000 | 0.0000 | −0.0000 |
| −0.0049 | −0.0000 | 0.0000 | −0.0000 | −0.0000 | −0.0000 | 0.0000 | −0.0000 |

Figure 9:
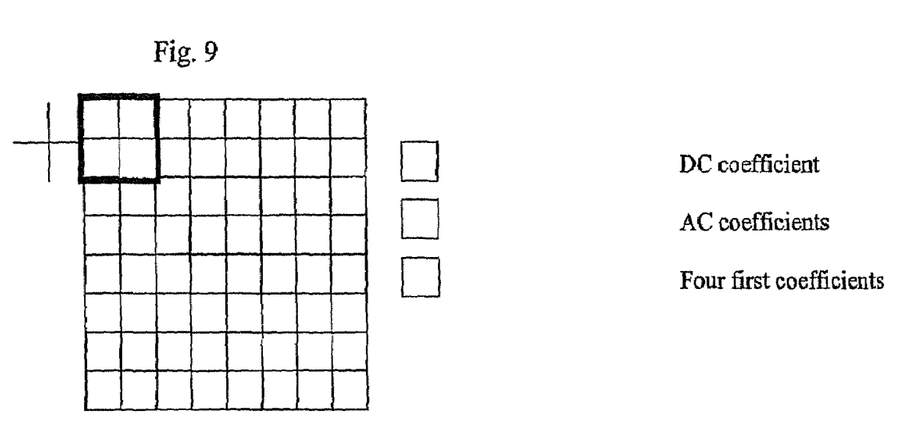
FIG. 9 illustrates the structure of JPEG DCT transform matrix.

Moreover, we leave only a DC coefficient and two first AC coefficients from the above matrix for the convolution in equation (2) (see FIG. 9). Additionally, only four first coefficients of the DCT block are preferably used in the convolution with DC and AC coefficients. For the rest of values in the DCT block we use only a DC term. Such approximations tremendously reduce the number of operations required for using equation (2), while not causing any noticeable effect on the image quality. The number of operations is therefore:

$$N_{Ops}^{Conv} = 3*4 + 60 = 72$$

for convolution and together with the rest of computation is:

$$N_{Ops}^{Total8\times8} = N_{Ops}^{Conv} + 2*64 = 200$$

In total this gives us 200 operations per 8×8 pixel block or about 3 arithmetic operations per pixel, which does not have zero value. Since, usually a significant portion of quantized DCT coefficients has zero values the total number of operations is even much lower. Moreover, because of the internal structure of the JPEG compression, zero coefficients are readily discarded from the bit-stream, therefore eliminating the need for performing the "If" command to detect zero values.

The following demonstrates the difference between full implementation of (2) and its approximated version as described above.

| | | | | | | | |
|---|---|---|---|---|---|---|---|
| 47.7297 | −5.1812 | 4.5870 | 1.4751 | −0.3810 | −0.1884 | 0.3149 | 0.2102 |
| 5.5363 | 4.0335 | −0.4527 | 0.1670 | 0.2715 | 0.1701 | −0.0877 | 0.0723 |
| −2.8023 | −2.0045 | 0.0058 | −0.2859 | −0.0841 | 0.0913 | 0.0522 | −0.1241 |
| 1.1058 | 0.7229 | −0.1104 | −0.4125 | −0.0240 | 0.0681 | 0.0810 | 0.1247 |
| 0.2933 | 0.2147 | −0.4209 | −0.2826 | 0.1584 | 0.1336 | −0.2955 | −0.1325 |
| −0.1125 | 0.1425 | 0.0175 | −0.1687 | −0.1530 | 0.0356 | −0.0440 | −0.0823 |
| 0.0001 | 0.1138 | 0.1315 | 0.1553 | 0.1206 | −0.0792 | −0.1002 | −0.0616 |
| 0.1705 | 0.1300 | 0.0178 | −0.0572 | 0.0924 | 0.1173 | 0.0052 | 0.0076 |
| 47.7297 | −5.1812 | 4.6349 | 1.5560 | −0.3841 | −0.1502 | 0.3183 | 0.2167 |
| 5.5363 | 4.0359 | −0.4483 | 0.1825 | 0.2784 | 0.1732 | −0.0843 | 0.0738 |
| −2.7693 | −2.0064 | 0.0061 | −0.2915 | −0.0880 | 0.0892 | 0.0504 | −0.1244 |
| 1.1733 | 0.7207 | −0.1036 | −0.4072 | −0.0231 | 0.0682 | 0.0811 | 0.1252 |
| 0.3151 | 0.2179 | −0.4196 | −0.2812 | 0.1586 | 0.1330 | −0.2956 | −0.1322 |
| −0.0934 | 0.1402 | 0.0190 | −0.1686 | −0.1530 | 0.0355 | −0.0442 | −0.0825 |
| 0.0069 | 0.1158 | 0.1313 | 0.1548 | 0.1210 | −0.0785 | −0.0998 | −0.0613 |
| 0.1744 | 0.1298 | 0.0177 | −0.0574 | 0.0927 | 0.1176 | 0.0050 | 0.0077 |

The upper block is a resultant DCT block for the full implementation of the equation (2).

The lower block is a resultant DCT block for the approximation of equation (2).

Color images are reconstructed in the similar way. The composing of a wide dynamic range image according to equation (2) is performed on each color plane separately, using same ω function for all colors. The input to ω is a DC component of the Y channel in the YCrCb case or Green channel in the RGB case.

Since a wide dynamic range image in accordance with the present invention is composed from two sequential exposures ("long" and "short") it is possible that there will be either local intra-scene or global inter-scene motion during the image acquisition. If not taken care, this motion can cause strong artifacts in the final image, degrading its quality.

To resolve the motion problem the following procedure is proposed:

Based on the estimated exposure Ratio (Ratio is defined by the mean of the relation of "long" image pixels to respective "short", which are not saturated and not in cut-off) a new "long" image is evaluated from the "short" for every pixel as:

$$\hat{I}^{Long} = \begin{cases} I^{Short} \cdot \text{Ratio} & \text{where } I^{Short} \cdot \text{Ratio} < 255 \\ 255 & \text{else} \end{cases}$$

Then the acquired $I^{Long}$ and evaluated $\hat{I}^{Long}$ images are compared per pixel basis and if $I^{Long}/\hat{I}^{Long}$ ratio is above or below certain thresholds the corresponding pixel is declared as motion affected pixel and is inserted into a motion mask index image. Depending on the image quality the thresholds might be adapted and varied for different intensity levels.

In order to make motion estimation more robust it is suggested to perform motion detection either on the estimated luminance channel or on the maximal difference image from R, G, B components. The luminance is obtained as:

$$Y=(R+2G+B)/4$$

while the maximal difference image is obtained as:

$$\max_{R,G,B}(|I_R^{Long} - \hat{I}_R^{Long}|, |I_G^{Long} - \hat{I}_G^{Long}|, |I_B^{Long} - \hat{I}_B^{Long}|)$$

If there is too much motion present in the image (i.e., motion count is too high), then the global motion is detected and the resultant image is produced either from one of the exposures—"long" or "short" (whichever is closer to the normal exposure) or from the normal image if available. (By "normal" is meant a regular image acquired under an average exposure conditions, which leads to underexposed and saturated portions of the scene in the image).

Next the motion mask is subjected to an order filter (a kind of a median filter), which effectively removes small, unconnected pixels leaving only significant parts of the mask, which represent motion. Specifically, the filter operates on 5×5 patch and uses $17^{th}$ element from a sorted array of the motion mask. Since the motion mask has a binary representation a fast implementation of the filter is possible by using look-up tables. In order to speed processing further the decimation by factor of 2 is used during the whole process of motion detection.

The above filtered motion mask is then processed with a low-pass filter in order to enable smooth transition from $I^{Long}$ to $\hat{I}^{Long}$. The filter is a simple low-pass FIR comprising of 7×7 mask with all ones.

Finally the value of $I^{Long}$ is replaced with the evaluated value of $\hat{I}^{Long}$ through the use of the motion mask:

$$I_{NEW}^{Long} = I^{Long} + \text{MotionMask} \cdot (\hat{I}^{Long} - I^{Long})$$

It should be noted that the above procedure for motion detection and compensation might be directly applied in the JPEG domain. As described previously only four most significant coefficients of the DCT transform might be used for the signal reconstruction and subsequent motion detection. The evaluation of $\hat{I}^{Long}$ might be performed directly on the DCT coefficients according to:

$$\hat{I}^{Long} = \hat{I}^{Short} \cdot \text{Ratio}$$

In cases where the "short" image does not bear sufficient information (due to cut-off condition) to be used for constructing "long" image, a respecting "long" image is used even if in the area of motion it is being saturated. This is done by incorporation of the motion area indication in to the illumination mask prior to the low-pass filter application. In such a way smearing of the motion region boarders leads to "soft" integration of the "long" image information in the resultant image.

Eliminating the need for the initial construction of the wide dynamic range image with a diapason of greater than 8 bit, enables application of the method of the present invention in cases where the camera (or any other imaging device) is not exactly calibrated, has rather higher noise levels and does not require linearity of the sensor. The suggested method of the present invention also does not require the estimation of the exposures ratio, which is a necessary step in previous methods. The noise and color artifacts characteristic to the construction of the wide dynamic range image are greatly reduced as well as the blockiness effect of the JPEG compression.

Moreover, the suggested method of the present invention in a preferred embodiment is capable of a very efficient implementation directly in the JPEG domain. The adaptation is possible due to the utilization of linear properties of the composition method (through the use of the illumination mask) used for the creation of wide dynamic range image. Such an approach allows one to obtain a significant savings in computation time and memory resources required for the acquisition of the wide dynamic range image.

A combination of the wide dynamic range image creation with an efficient implementation in the JPEG domain provides a feasible solution to the imaging on various portable devices with limited resources.

The method proposed in this invention is directly applicable to the MPEG compressed movies.

Hereinafter we refer to implementation of the present invention directly in the JPEG domain.

Representative DCT blocks of the "long", "short" and reconstructed wide dynamic range images are shown next:

| a) DCT block of the "long" image | | | | | | | |
|---|---|---|---|---|---|---|---|
| 1733 | 9 | 37 | −25 | −30 | −5 | 4 | 10 |
| 37 | −24 | 17 | −2 | 24 | 5 | 6 | −4 |
| −70 | 2 | −20 | 2 | −3 | −2 | 3 | −13 |
| −39 | 2 | −10 | 4 | 15 | 12 | −1 | 9 |
| 8 | 9 | 28 | 11 | −2 | −16 | −5 | −2 |
| −10 | 4 | 11 | −18 | −7 | 0 | 3 | 5 |
| −23 | −3 | 3 | −4 | 2 | −3 | −3 | −3 |
| 13 | 2 | 0 | −8 | −7 | 3 | 4 | 2 |
| b) DCT block of the "short" image | | | | | | | |
| 650 | 15 | 6 | −12 | 9 | 19 | 1 | 1 |
| 20 | −14 | 4 | 2 | 3 | −9 | −2 | −6 |
| −19 | −8 | −8 | 9 | 3 | 3 | 2 | 3 |
| 11 | −7 | 5 | 7 | 0 | −4 | −4 | 0 |
| −8 | 6 | 7 | 8 | −9 | −14 | 3 | −2 |
| 10 | 2 | −4 | −2 | 3 | 14 | −2 | 1 |
| −13 | 6 | 1 | 3 | −3 | −5 | 0 | −1 |
| 2 | −2 | 5 | −2 | −1 | 3 | 0 | 3 |
| c) Composed DCT block of the wide dynamic range image | | | | | | | |
| 2600 | 60 | 24 | −48 | 36 | 76 | 4 | 4 |
| 80 | −56 | 16 | 8 | 12 | −36 | −8 | −24 |
| −76 | −32 | −32 | 36 | 12 | 12 | 8 | 12 |
| 44 | −28 | 20 | 28 | 0 | −16 | −16 | 0 |
| −32 | 24 | 28 | 32 | −36 | −56 | 12 | −8 |
| 40 | 8 | −16 | −8 | 12 | 56 | −8 | 4 |
| −52 | 24 | 4 | 12 | −12 | −20 | 0 | 4 |
| 8 | −8 | 20 | −8 | −4 | 12 | 0 | 12 |

Color images are reconstructed in the similar way. The composing of the wide dynamic range image according to equation (2) is performed on each plane separately, using same α function for all colors. The input to α is a DC component of the Y channel in the YCrCb case or Green channel in the RGB case.

Following the construction of the wide dynamic range image (for example of 12 bit) from "long" and "short" images it is necessary to convert it to a normal dynamic range image (usually of 8 bits) which can be displayed on a regular monitor. Such conversion is usually performed by the operation called "companding", which is basically applying a gamma function to the wide dynamic range image.

Figure 1:
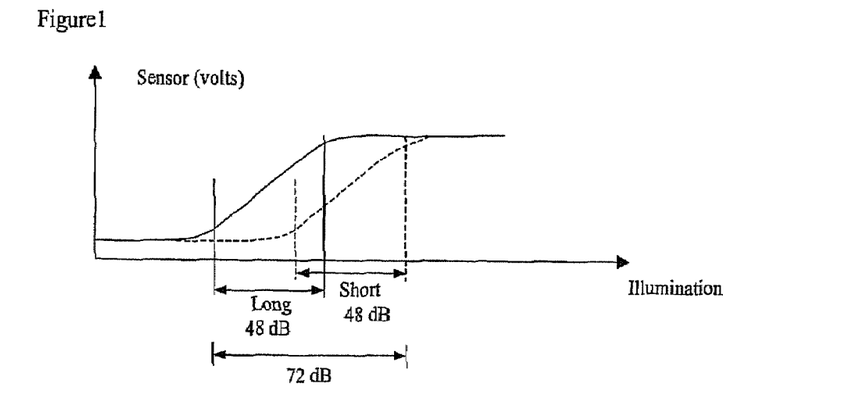
FIG. 1 illustrates the dynamic ranges associated with "short" and "long" exposures.
Figure 2:
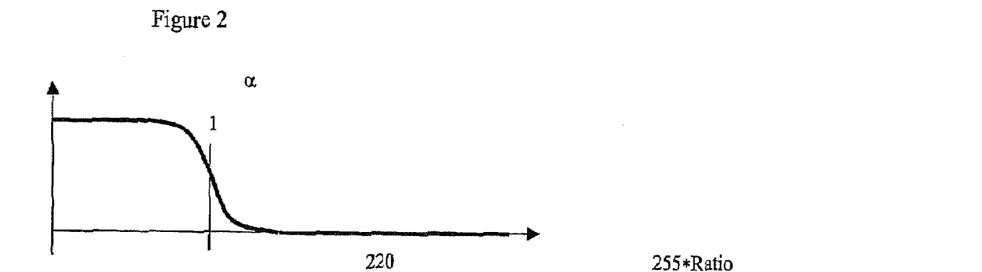
FIG. 2 illustrates a proposed function for combined "short" and "long" exposures, in accordance with a preferred embodiment of the present invention.
Figure 3:
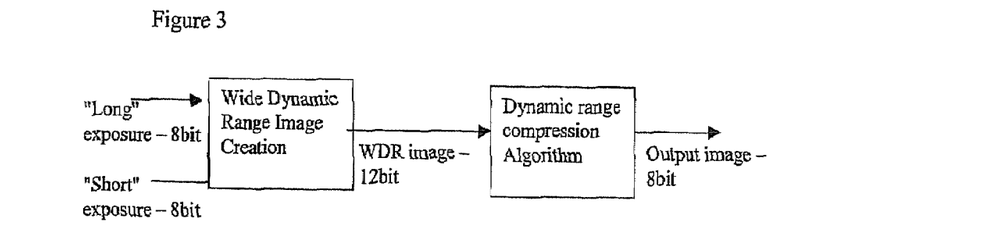
FIG. 3 illustrates a preferred embodiment of the process of enhancing dynamic range imaging in accordance with the present invention.
Figure 4:
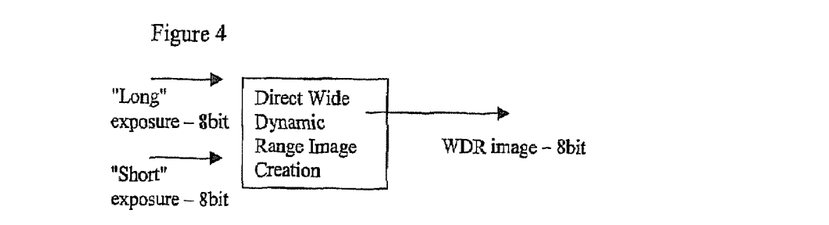
FIG. 4 illustrates another preferred embodiment of the process of enhancing dynamic range imaging in accordance with the present invention.
Figure 5A:
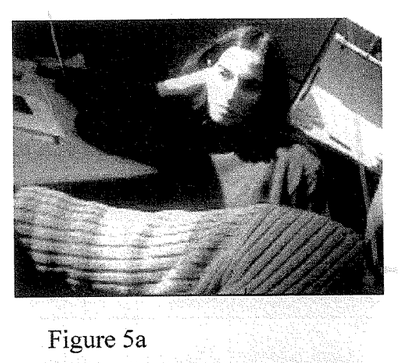
FIG. 5a is an example of a "long" exposure image.
Figure 5B:
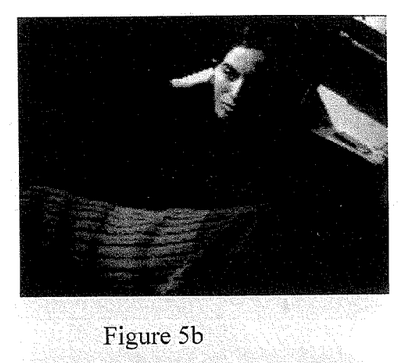
FIG. 5b is an example of a "short" exposure image.
Figure 5C:
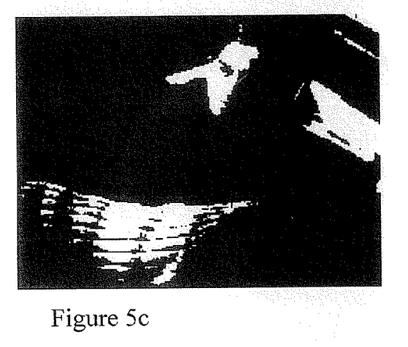
Figure 5D:
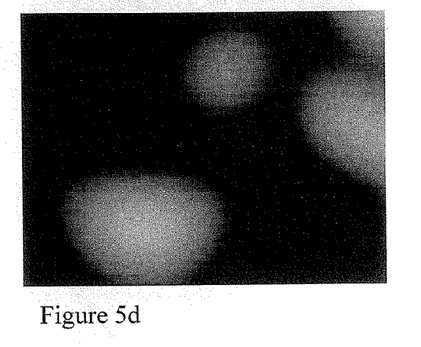
FIG. 5d is an illumination mask image produced by a low-pass filter.
Figure 5E:
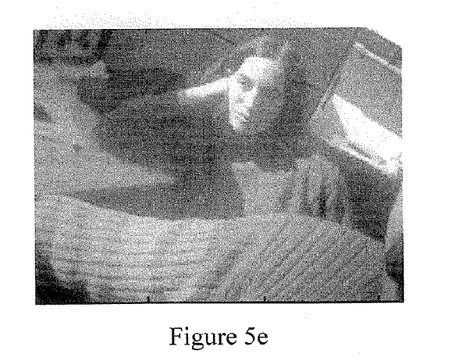
FIG. 5e is an enhanced wide dynamic range image made of the "long" and "short" exposure images using the illumination mask, in accordance with a preferred embodiment of the present invention.
Figure 6A:
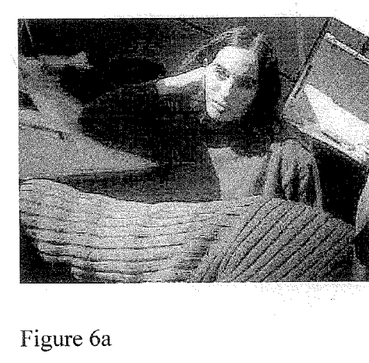
FIG. 6a is an enhanced wide dynamic range image produced in a known high dynamic range enhancement.
Figure 6B:
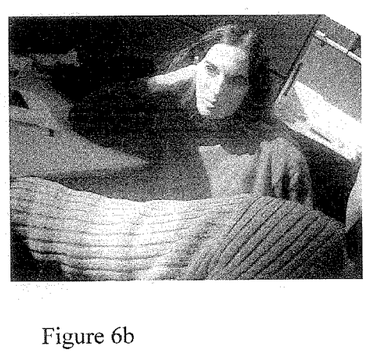
FIG. 6b is an enhanced wide dynamic range image produced in accordance with a preferred embodiment of the present invention.
Figure 7:
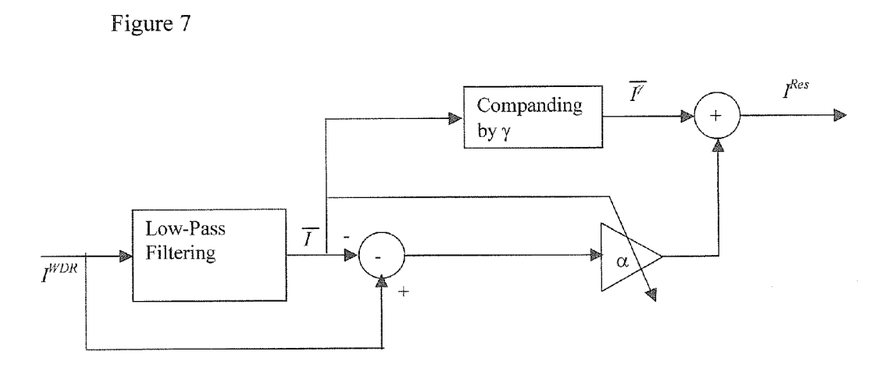
FIG. 7 illustrates a preferred embodiment of the wide dynamic range enhancement method in accordance with a preferred embodiment of the present invention.
Figure 8A:
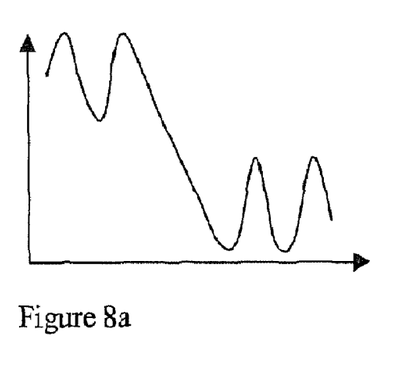
FIGS. 8a through 8f illustrate the companding process in accordance with a preferred embodiment of the present invention.
Figure 8B:
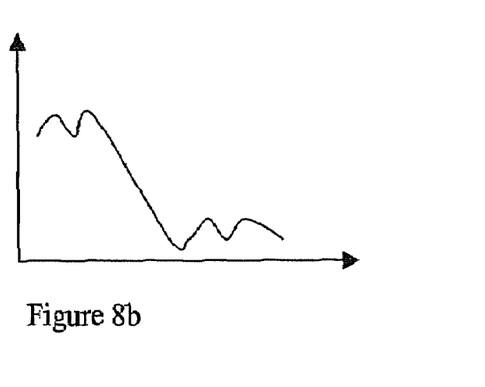
Figure 8C:
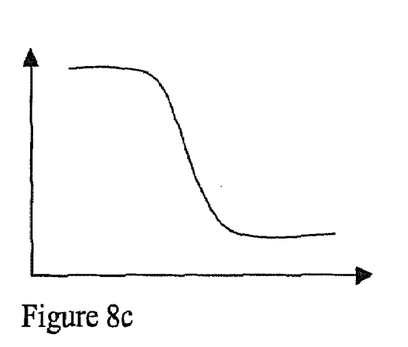
Figure 8D:
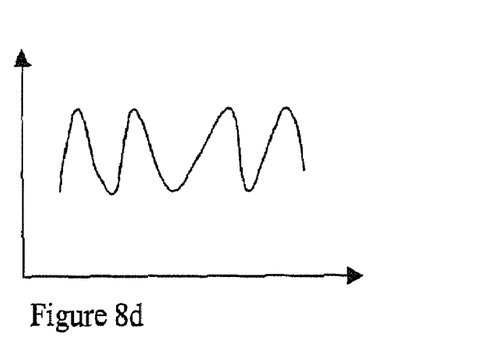
Figure 8E:
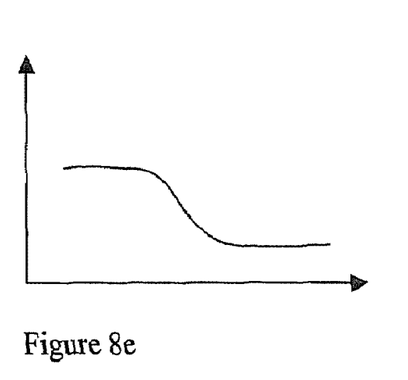
Figure 8F:
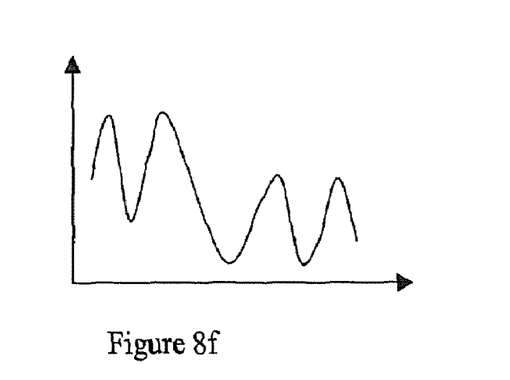

However, companding tends to wash out image details, especially in the bright areas since in these regions gamma function has very flat response. In order to overcome this an operation similar to "unsharp masking" is made on the image prior to companding. This operation strips the details from the wide dynamic range image and then after the gamma function is applied to the low-pass version of the wide dynamic range image, full scale details are added back and the resultant image has a contrast appearance. The whole procedure is demonstrated in FIG. 7.

$$I^{Res} = \bar{I} + \alpha(\bar{I}) \cdot (I^{WDR} - \bar{I}) \tag{3}$$

We described hereinbefore the procedure for converting the wide dynamic range signal would be performed in the image domain. Here it is however implemented directly in the JPEG domain on the DCT transformed signal.

To implement the above procedure in the JPEG domain, the terms in equation (3) are regrouped differently.

$$I^{Res} + \alpha(\bar{I}) \cdot I^{WDR} = \alpha(\bar{I}) \cdot \bar{I} - \bar{I} = \alpha(\bar{I}) \cdot I^{WDR} + f(\bar{I}) \tag{4}$$

where $f(\bar{I})$ is a composite function of $\bar{I}$—low-pass image.

Since the resultant $I^{Res}$ image in (4) is a linear combination of the $\alpha * I^{WDR}$ and $f(\bar{I})$ it is possible to consider (4) in the DCT domain, i.e.

$$I^{DCTRes} + \alpha(\bar{I}) \cdot I^{DCTWDR} + f^{DCT}(\bar{I}) \tag{5}$$

Examining equation (5) it seen that the resultant image in the DCT domain is a combination of the DCT transform of the $I^{WDR}$ and the DCT transform of a composite function of the low-pass image. The low-pass image in the DCT domain is represented by its DC coefficients (in 8×8 pixel blocks); therefore it is reasonable to assume that we can approximate the low-pass of the complete image by making a bilinear (or bi-cubic version) interpolation of its DC components. Then by making a forward DCT transform of the interpolated low-pass image the $f^{DCT}(\bar{I})$ term in equation (5) is produced. For actual computation it is not necessary to perform the whole interpolation and DCT decomposition because their combination is a well-defined operation that might be precomputed and then applied as a look-up table to four surrounding points of the DC component in the bilinear interpolation. Alternatively, the full low-pass image might be constructed by using not only the DC terms but the first order components of the DCT transform thus making even better approximation to the second term in equation (5).

The resultant image $I^{Res}$ is produced directly in the JPEG domain thus eliminating the need for a decompression of the "long" and "short" images and subsequent re-compression of the result, ensuing significant computation time and memory savings.

Depending on the extent of the dynamic range of the scene it might be necessary to enhance differently the details in the resultant $I^{Res}$ image. When the dynamic range is small (Ratio between "long" and "short" images close to 1) the enhancement of the details in bright and dark areas should be similar, because the gamma function in the companding function is almost linear. However for the wide dynamic range images a compounding the gamma function is strong, thus making details enhancement dependant on the local image brightness. This correction of details enhancement might be easily incorporated into our scheme of the wide dynamic range compression. Since for each 8×8 pixels block the DCT transform provides a ready-made decomposition to low-pass and high-pass frequencies, it is possible to enhance progressively higher frequencies in increasing order by simply amplifying the DCT coefficients.

This may be done either directly by multiplying the coefficients in a zigzag order of the $I^{DCT_{WDR}}$ image in every block, or simply to adjust the coefficients quantization table for the subsequent JPEG decompression. It is even possible to vary the extent of the enhancement according to the DC value of the current block, or the value of the interpolated low-pass signal.

To sum up the process: in the first stage a wide dynamic range image is constructed based on the "long" and "short" exposure images using DCT transform coefficients. The construction is possible due to the utilization of linear properties of the composition method used for the creation of wide dynamic range image. Such an approach allows one to obtain a significant savings in computation time and memory resources required for the acquisition of wide dynamic range image.

In the second stage a compression of wide dynamic range image into the normal image, displayable on the monitor, is performed using a direct JPEG domain based method. The proposed scheme enables to preserve image details usually lost during the standard methods utilizing companding functions and even to perform an enhancement of the image details.

A combination of wide dynamic range image creation with its subsequent conversion into a clear and detailed normal image provides a feasible solution to the imaging on various portable devices with limited resources. The method proposed in the present invention is directly applicable to the MPEG compressed movies.

It should be clear that the description of the embodiments and attached Figures set forth in this specification serves only for a better understanding of the invention, without limiting its scope as covered by the following Claims and their equivalents.

It should also be clear that a person skilled in the art, after reading the present specification could make adjustments or amendments to the attached Figures and above described embodiments that would still be covered by the following Claims and their equivalents.

We claim:

1. A method for enhancing wide dynamic range in images, the method comprising:
   using an imaging device acquiring at least two images of a scene to be imaged, the images acquired using different exposure times; and
   using a processor performing the following steps:
      constructing for a first image of said at least two images an illumination mask corresponding to the illumination in the scene, comprising a set of continuous weight values distinctively identifying respective areas of pixels of high or low illumination, over-exposed or underexposed with respect to a predetermined threshold illumination value, assigning one of the weight values to each pixels, whereas other weight value is assigned to other pixels of the other of said at least two images;
      using a spatial low-pass filter that for a given pixel position takes into account information from pixels that are a plurality of pixels away from the given pixel position in different spatial directions to smooth border zones on the illumination mask, thus assigning pixels in the border zones new continuous weight values in a range between the weight values; and
      constructing a combined image in the DCT transform domain using combined weight values with image data of pixels assigned with one weight value of the first image and image data of pixels assigned with other weight value of the other of said at least two images and in pixels corresponding to the border zones using image data from said at least two images proportional to the new weight values.

2. The method of claim 1, wherein the weight values are binary values.

3. The method of claim 1, wherein the acquired images are in JPEG format, the JPEG format including a DCT transform domain.

4. The method of claim 1, applied for color imaging, wherein the steps of claim 1 are carried our separately for each color plane.

5. The method of claim 1, further comprising:
   detecting pixels in said at least two images indicative of motion by comparing corresponding image data from said at least two images; and
   evaluating image data value for pixels identified as indicative of motion using image data from one of said at least two images and using the image data value in constructing the combined image.

6. The method of claim 5, wherein the step of constructing a combined image includes using for pixels identified as indicative of motion only image data from one of said at least two images.

7. The method of claim 6, wherein the image data from one of said at least two images is reconstructed to simulate corresponding pixels in the other of said at least two images.

8. The method of claim 7, wherein using image data from one of said at least two images which was acquired with longest exposure time incorporated in two illumination masks.

9. The method as claimed in claim 1, further comprising companding the constructed image.

10. The method as claimed in claim 9, wherein the step of companding comprises using the illumination mask.

11. The method as claimed in claim 10, wherein the step of companding comprises applying the formula for each pixel:

$$I^{Res} = I^\gamma + \alpha(I) \cdot (I^{WDR} - I)$$

where $I^{Res}$ is the result illumination value, $I^\gamma$ is the illumination value after gamma correction, $\alpha$ is constant, $I^{WDR}$ is the wide dynamic range illumination value and I is original illumination value.

12. The method as claimed in claim 1, wherein the step of using a spatial low-pass filter to smooth border zones on the illumination mask, includes using a spatial low-pass filter that for a given pixel position takes into account information from pixels that are at least 8 pixels away from the given pixel position in different spatial directions.

* * * * *